US010361986B2

(12) United States Patent
Crocker et al.

(10) Patent No.: US 10,361,986 B2
(45) Date of Patent: Jul. 23, 2019

(54) GAMEPLAY IN A CHAT THREAD

(71) Applicant: Disney Enterprises, Inc., Burbank, CA (US)

(72) Inventors: John Crocker, Valencia, CA (US); Randall Davis, Stevenson Ranch, CA (US); Orrin Shively, Glendale, CA (US); Christopher W. Heatherly, Monrovia, CA (US); James Molinets, Moorpark, CA (US)

(73) Assignee: Disney Enterprises, Inc., Burbank, CA (US)

( * ) Notice: Subject to any disclaimer, the term of this patent is extended or adjusted under 35 U.S.C. 154(b) by 438 days.

(21) Appl. No.: 14/500,806

(22) Filed: Sep. 29, 2014

(65) Prior Publication Data
US 2016/0092035 A1 Mar. 31, 2016

(51) Int. Cl.
G06F 3/0488 (2013.01)
H04L 12/58 (2006.01)
G06F 3/0481 (2013.01)

(52) U.S. Cl.
CPC ............ *H04L 51/32* (2013.01); *G06F 3/0488* (2013.01); *G06F 3/04817* (2013.01); *H04L 51/10* (2013.01)

(58) Field of Classification Search
CPC ....... H04L 51/32; H04L 12/581; H04L 51/10; G06Q 10/10; G06Q 30/00; G06Q 50/00
USPC ........................................................ 715/752
See application file for complete search history.

(56) References Cited

U.S. PATENT DOCUMENTS

| 6,522,333 | B1 | 2/2003 | Hatlelid |
| 6,990,452 | B1 | 1/2006 | Ostermann |
| 7,386,799 | B1 | 1/2008 | Clanton |
| 7,478,129 | B1 * | 1/2009 | Chemtob ............ H04L 12/1827 709/204 |
| 7,549,924 | B2 | 1/2009 | Canessa |

(Continued)

FOREIGN PATENT DOCUMENTS

| WO | WO 2007/134402 | 11/2007 | |
| WO | WO-2008104988 A2 * | 9/2008 | ............. A63F 13/12 |
| WO | WO 2014/002704 | 1/2014 | |

OTHER PUBLICATIONS

Adam Moore et al. "Design and development of an empirical smiley-based affective instrument" pp. 1-12.

(Continued)

*Primary Examiner* — Joy M Weber
(74) *Attorney, Agent, or Firm* — Farjami & Farjami LLP

(57) ABSTRACT

There is provided a system and method for user generated gameplay in chat. The system including a memory storing a text and multimedia messaging software application, and a processor configured to execute the text and multimedia messaging software application to initiate a message exchange session with a remote mobile device, in response to a request received from a user of the mobile device, the message exchange session displaying a user interface for exchanging text and multimedia messages, provide a plurality of games for selection by the user to be played during the message exchange session and within the user interface for exchanging text and multimedia messages, receive a selection of one of the plurality of games by the user after initiating the message exchange session, and initiate the one of the plurality of games for playing within the user interface for exchanging text and multimedia messages.

16 Claims, 11 Drawing Sheets

(56) References Cited

U.S. PATENT DOCUMENTS

| | | | |
|---|---|---|---|
| 7,647,560 B2 | 1/2010 | MacAuley | |
| 7,669,135 B2 | 2/2010 | Cunningham | |
| 7,788,176 B2* | 8/2010 | Gupta | A63F 13/12 463/41 |
| 7,835,729 B2 | 11/2010 | Hyon | |
| 7,861,175 B2* | 12/2010 | Wormald | A63F 13/12 463/40 |
| 8,037,139 B1* | 10/2011 | Fish | H04L 12/581 709/204 |
| 8,074,176 B2 | 12/2011 | Grace | |
| 8,149,241 B2 | 4/2012 | Do | |
| 8,353,760 B2 | 1/2013 | Ocko | |
| 8,460,099 B2 | 6/2013 | Barclay | |
| 8,620,850 B2 | 12/2013 | Brown | |
| 8,677,250 B2 | 3/2014 | Wormald | |
| 8,694,899 B2 | 4/2014 | Goossens | |
| 8,726,195 B2 | 5/2014 | Bill | |
| 9,003,306 B2* | 4/2015 | Mehin | H04L 12/1827 715/758 |
| 9,553,832 B2* | 1/2017 | Blayer | H04L 51/046 |
| 2004/0224772 A1* | 11/2004 | Canessa | A63F 13/12 463/42 |
| 2005/0137015 A1 | 6/2005 | Rogers | |
| 2005/0163379 A1 | 7/2005 | Zimmermann | |
| 2005/0192078 A1* | 9/2005 | Jawaharlal | G07F 17/32 463/17 |
| 2006/0015560 A1 | 1/2006 | MacAuley | |
| 2006/0053380 A1* | 3/2006 | Spataro | G06F 17/30011 715/753 |
| 2007/0005704 A1* | 1/2007 | Heron | H04L 12/1818 709/206 |
| 2008/0163074 A1 | 7/2008 | Tu | |
| 2008/0235285 A1 | 9/2008 | Della | |
| 2009/0253517 A1 | 10/2009 | Bererton | |
| 2010/0106612 A1* | 4/2010 | Gupta | A63F 13/12 705/50 |
| 2010/0179991 A1 | 7/2010 | Lorch | |
| 2011/0107239 A1 | 5/2011 | Adoni | |
| 2012/0178536 A1* | 7/2012 | Oh | H04L 12/1822 463/42 |
| 2013/0055112 A1 | 2/2013 | Joseph | |
| 2013/0173727 A1 | 7/2013 | Libin | |
| 2014/0067397 A1 | 3/2014 | Radebaugh | |
| 2014/0280551 A1* | 9/2014 | Byrd Vallieres de St. Real | H04L 67/22 709/204 |
| 2014/0280603 A1* | 9/2014 | Rideout | H04L 51/046 709/205 |
| 2016/0014257 A1* | 1/2016 | He | G06Q 10/10 455/414.1 |

OTHER PUBLICATIONS

Eigo Ito et al. "*A Proposal of Intuitive and Immediate Emoticons System*" 2013 4$^{th}$ International conference on Intelligent Systems, Modelling and Simulation. pp. 1-5.

uQuery "GamePress—Create, Share, Play." http://www.uquery.com/apps/Q8Fdb/gamepress-create-share-play May 30, 2014. pp. 1-2.

uQuery "Playr—Create and Play your own Addictive Games" http://www.uquery.com/apps/sZ72A/playr-create-and-play-your-own-addictive-games May 30, 2014. pp. 1-2.

\* cited by examiner

GAMEPLAY IN A CHAT THREAD

BACKGROUND

Nowadays, users of mobile devices are able to chat with their friends and family using various messaging applications. When chatting with friends and family, these users are able to send chat messages, pictures, and movies. However, users of these current messaging applications may find it boring to only be able to send chat messages, pictures, and movies to friends and family. For example, a user may want to play games with his or her friends and family. This can cause a problem since it requires the user to exit out of his or her messaging application to launch a gaming software application that is directed towards a game. Furthermore, this also requires the friends and family of that user to also have the same gaming software application installed on their own mobile device in order to play with the user.

SUMMARY

The present disclosure is directed to a system and method for gameplay in a chat thread, substantially as shown in and/or described in connection with at least one of the figures, as set forth more completely in the claims.

DETAILED DESCRIPTION

Figure 1:
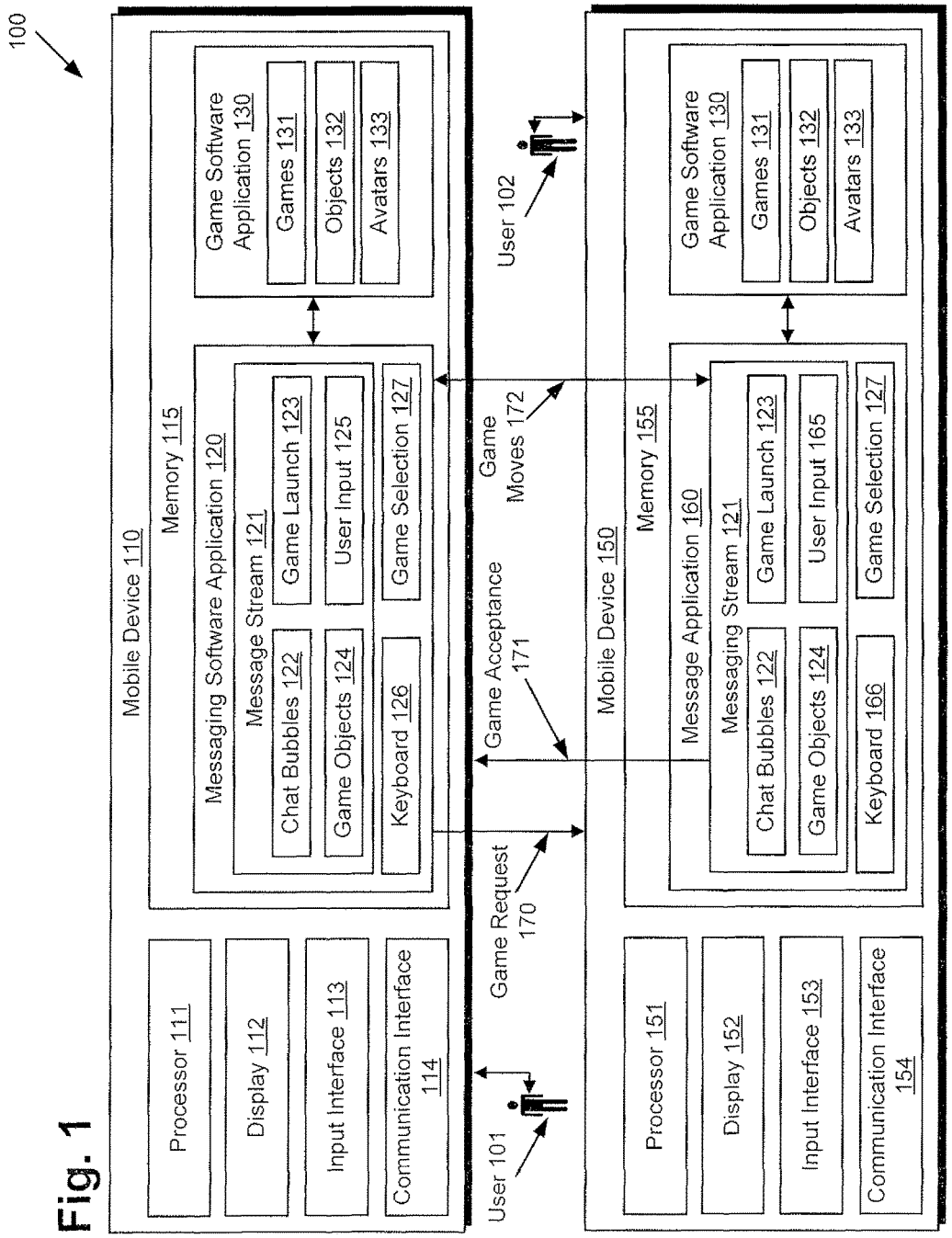
FIG. 1 presents a system for integrating gameplay in a chat thread, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for integrating game mechanics in a chat thread, according to one implementation of the present disclosure. System 100 of FIG. 1 includes user 101 in possession of mobile device 110, and user 102 in possession of mobile device 150. Mobile device 110 includes processor 111, display 112, input interface 113, communication interface 114, and memory 115. Memory 115 includes messaging software application 120 and game software application 130. Messaging software application 120 includes message stream 121, keyboard 126, and game selection 127. Message stream 121 includes chat bubbles 122, game launch 123, game objects 124, and user input 125. Game software application 130 includes games 131, objects 132, and avatars 133. Mobile device 150 includes processor 151, display 152, input interface 153, communication interface 154, and memory 155. Memory 155 includes messaging application 160 and game software application 130. Messaging application 160 includes message stream 121, keyboard 166, and game selection 127. Message stream 121 includes chat bubbles 122, game launch 123, game objects 124, and user input 165. System 100 of FIG. 1 further includes game request 170, game acceptance 171, and game moves 172.

Mobile device 110 may comprise a mobile phone, a tablet, a personal computer, or any other device capable of executing a messaging software application to communicate with other mobile devices. As shown in FIG. 1, mobile device 110 includes display 112 and input interface 113. Input interface 113 may comprise, for example, a keyboard, a mouse, a game controller, a touch-screen input, a thermal and/or electrical sensor, or any other device capable of accepting user input for use with mobile device 110. Display 112 may comprise a liquid crystal display (LCD) screen built into mobile device 110. In alternative implementations of the present disclosure, display 112 may be another type of display hardware, such as cathode-ray tubes (CRT) monitors. In yet other implementations, display 112 may also be touch sensitive and may serve as input interface 113.

Mobile device 110 further includes processor 111 and memory 115. Processor 111 may be configured to access memory 115 to store received input or to execute commands, processes, or programs stored in memory 115, such as messaging software application 120 and game software application 130. Processor 111 may correspond to a processing device, such as a microprocessor or similar hardware processing device, or a plurality of hardware devices. However, in other implementations processor 111 refers to a general processor capable of performing the functions required of mobile device 110. Memory 115 is a sufficient memory capable of storing commands, processes, and programs for execution by processor 111. Memory 115 may be instituted as ROM, RAM, flash memory, or any sufficient memory capable of storing a set of commands. In other implementations, memory 115 may correspond to a plurality memory types or modules.

Also illustrated in FIG. 1, mobile device 110 further includes communication interface 114. In the implementation of FIG. 1, communication interface 114 includes any device that is capable both transmitting data with a transmitter and receiving data with a receiver. Processor 111 of mobile device 110 is thus configured to control communication interface 114 to communicate with other mobile devices, such as mobile device 150.

It should be noted that mobile device 150, processor 151, display 152, input interface 153, communication interface 154, and memory 155 may be similar to mobile device 110, processor 111, display 112, input interface 113, communication interface 114, and memory 115, respectively. For example, mobile device 150 may include a mobile phone, a tablet, a personal computer, or any other device capable of executing a messaging software application to communicate with other mobile devices. Processor 151 may be configured to access memory 155 to store received input or to execute commands, processes, or programs stored in memory 155, such as messaging application 160 and game software application 130. Furthermore, processor 151 of mobile device 150 may be configured to control communication interface 154 to communicate with other mobile devices using any wired or wireless technology.

Also illustrated in FIG. 1, mobile device 110 includes game software application 130. Mobile device 110 may utilize game software application 130 to create and play games with other mobile devices, where the games are created and played within a messaging application, such as messaging software application 120. Messaging software application 120 may include a software application used by mobile device 110 to communicate with other mobile devices, such as mobile device 150. For example, messaging software application 120 may include a short message service (SMS) used by mobile device 110 to send and receive text and multimedia messages with other mobile devices. As such, by utilizing game software application 130, mobile device 110 is able to allow user 101 to directly create and play games within messaging software application 120, thus extending the capabilities of messaging software application 120.

It should be noted that the implementation of FIG. 1 only illustrates messaging software application 120 as being separate from game software application 130, however, the present disclosure is not limited to the implementation of FIG. 1. For example, in other implementations, messaging software application 120 and game software application 130 may be combined into a single software application.

As illustrated in FIG. 1, game software application 130 includes games 131, objects 132, and avatars 133. Games 131 may include a list of games that user 101 of mobile device 110 may select from when creating a game within messaging software application 120. For example, and as will be illustrated in FIGS. 2, 4A, 4B, 6, 8, and 10, games 131 may include, but are not limited to, user generated games, shooting games, dice games, avatar games, and trading games. Objects 132 may include different objects that can be used by user 101 of mobile device 110 when creating and playing one or more of games 131. For example, objects 132 may include, but are not limited to, avatars, people, cars, buildings, food, animals, pictures, movie clips, or any other objects that can be utilized to create and play different games 131. Finally, avatars 133 may include all of the different avatars that may be utilized by user 101 of mobile device 110 when creating and playing one or more of games 131.

Also illustrated in FIG. 1, messaging software application 120 includes message stream 121, keyboard 126, and game selection 127. Message stream 121 may include an user interface used by user 101 of mobile device 110 to exchange text and multimedia messages with users of other mobile devices, such as user 102 of mobile device 150. For example, message stream 121 may include a list of each of the messages that have been exchanged between mobile device 110 and mobile device 150. Keyboard 126 may include the keyboard used by user 101 of mobile device 110 to transmit messages within message stream 121. For example, keyboard 126 may include, but is not limited to, a normal keyboard that includes letters for typing words or a special keyboard that can be used to type special figures, such as different emotional faces or objects. Finally, game selection 127 may include a selection button included within messaging software application 120 that user 101 of mobile device 110 uses to select games to be created and played within message stream 121. For example, game selection 127 may allow user 101 to select one or more of games 131 from game software application 130.

It should be noted that messaging application 160 and keyboard 166 of mobile device 150 may be similar to messaging software application 120 and keyboard 126 of mobile device 110. For example, messaging application 160 may include a software application used by user 102 of mobile device 150 to communicate with users of other mobile devices, such as user 101 of mobile device 110. As such, messaging software application 120 and messaging application 160 may include the same SMS, or messaging software application 120 and messaging application 160 may include different SMSs. Furthermore, keyboard 166 may be similar to keyboard 126 except that keyboard 166 is generated specifically for messaging application 160 of mobile device 150.

Also illustrated in FIG. 1, message stream 121 includes chat bubbles 122, game launch 123, game objects 124, and user input 125. Chat bubbles 122 may include objects within message stream 121 that are used to distinguish between each text and multimedia message that exchanged using message stream 121. For example, if message stream 121 includes a chat stream between mobile device 110 and mobile device 150, chat bubbles 122 would distinguish between each message that is exchanged between mobile device 110 and mobile device 150. In such an example, chat bubbles 122 are created each time user 101 of mobile device 110 transmits a message to user 102 of mobile device 150, and each time user 101 of mobile device 110 receives a message from user 102 of mobile device 150.

Game launch 123 may include a message sent within message stream 121 that either requests the starting of one of games 131, or accepts a request of one of games 131 if mobile device 110 has already received the request from another mobile device. For example, and using the example above where message stream 121 includes an input interface for exchanging messages between mobile device 110 and mobile device 150, game launch 123 may include a game request transmitted from mobile device 110 to mobile device 150 within message stream 121 requesting the start of one of games 131. For another example, and again using the example above where message stream 121 includes an user interface for exchanging messages between mobile device 110 and mobile device 150, if mobile device 110 has already received a game request from mobile device 150, then game launch 123 may include an acceptance of the request by user 101 of mobile device 110. In such an example, the request may be displayed within message stream 121 in one of chat bubbles 122.

Game objects 124 may include each of the objects that have been used to create and play the game within message stream 121. For example, game objects 124 may include one or more of objects 132, or game objects 124 may include one or more of avatars 133. Finally, user input 125 may include each move made by user 101 of mobile device 110 during the playing of the game. For example, if user 101 of mobile device 110 is playing a game with user 102 of mobile device 150, user input 125 would include each move made by user 101 of mobile device 110 during the playing of the game, and user input 165 would include each move made by user 102 of mobile device 150 during the playing of the game.

In the implementation of FIG. 1, user 101 of mobile device 110 may be using messaging software application 120 to exchange text and multimedia messages with user 102 of mobile device 150, where the messages are displayed using chat bubbles 122 within message stream 121. During the conversation between user 101 and user 102, user 101 may decide that he or she wants to play a game with user 102. In order to play a game with user 102, user 101 uses game selection 127 to select one of games 131, where game selection 127 was added to messaging software application 120 by game software application 130. After selecting one of games 131 using game selection 127, mobile device 110 transmits game request 170 to mobile device 150 by posting game request 170 within message stream 121.

User 102 of mobile device 150 may receive game request 170 from user 101 of mobile device 110 within message stream 121, where game request 170 is displayed to user 102 within one of chat bubbles 122. User 102 may then accept game request 170 received by user 101 and mobile device 150 and may transmit game acceptance 171 to mobile device 110 in response. By accepting game request 170 from user 101 of mobile device 110, user 101 of mobile device 110 and user 102 of mobile device 150 have created a game within message stream 121. User 101 and user 102 are now able to play each other in a friendly game within message stream 121, using various game moves 172 (corresponding to user input 125 and user input 165). As such, user 101 is not required to download or launch a new software application to play a game with user 102.

It should be noted that in some implementations, and as discussed above, display 112 may be touch sensitive and serve as input interface 113. In such implementations, the game may be displayed on display 112 of mobile device 110 and user input 125 may be made by user 101 directly touching parts of display 112. For example, if the game is a shooting game, user input 125 may include user 101 shooting at game objects 124 within the game by directly touching parts of display 112 where game objects 124 are located.

Figure 2:
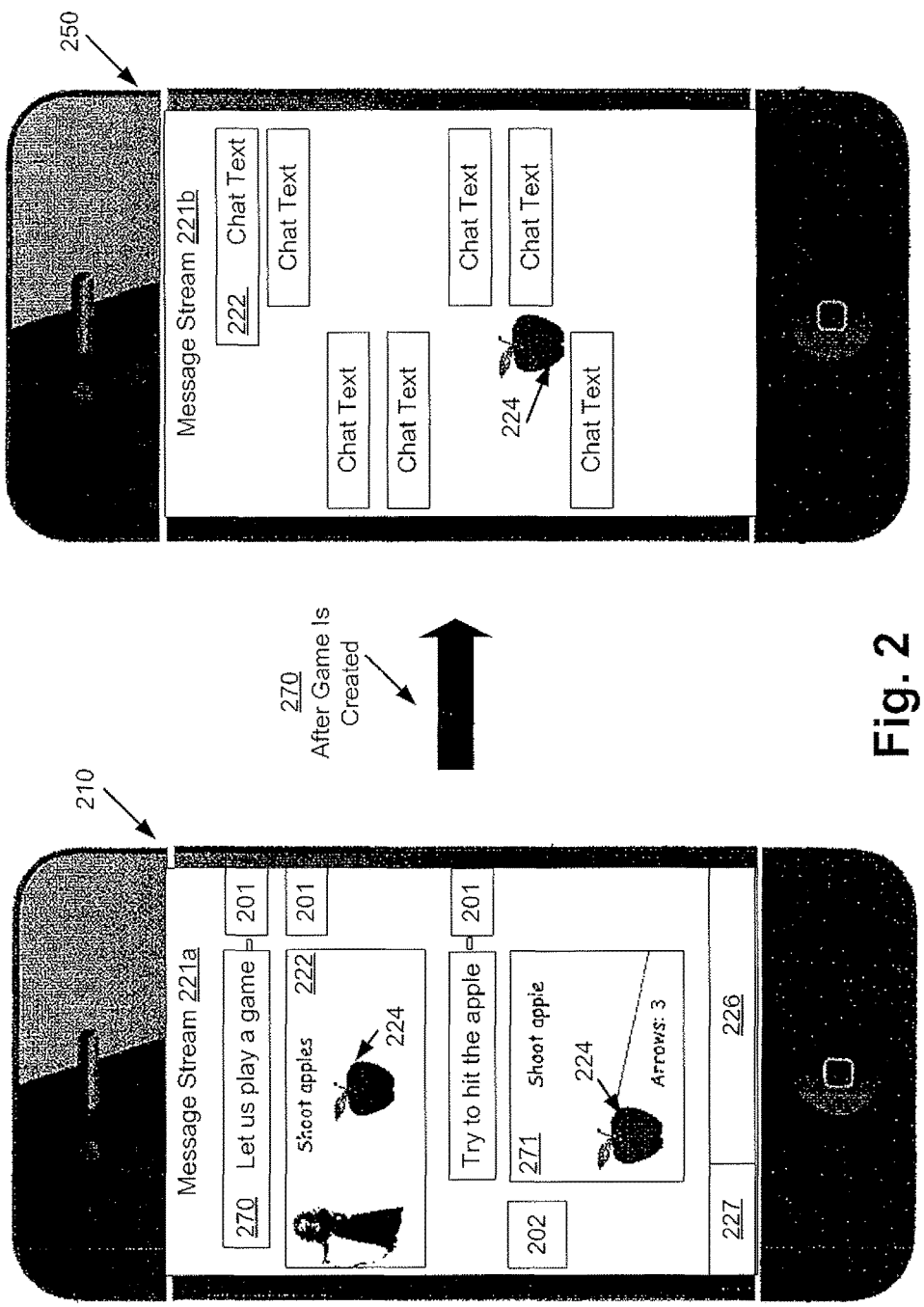
FIG. 2 presents an example of user generated gameplay levels in a chat thread, according to one implementation of the present disclosure.

FIG. 2 presents an example of user generated gameplay levels in a chat thread, according to one implementation of the present disclosure. FIG. 2 includes mobile device 210 and mobile device 250. Mobile device 210 includes message stream 221a, keyboard 226, and game selection 227. Message stream 221a includes chat bubbles 222 (corresponding messages exchanged between user 201 and user 202 within message stream 221a), game object 224, game request 270, and game acceptance 271. Message stream 221a further includes messages from user 101 and user 102. Mobile device 250 includes message stream 221b, which includes chat bubbles 222 and game object 224.

With respect to FIG. 2, it should be noted that user 201, user 202, mobile device 210, each of message stream 221a and message stream 221b, chat bubbles 222, game object 224, keyboard 226, game selection 227, game request 270, and game acceptance 271 correspond respectively to user 101, user 102, mobile device 110, message stream 121, chat bubbles 122, game objects 124, keyboard 127, game selection 127, game request 170, and game acceptance 171 from FIG. 1. It should further be noted that only one of chat bubbles 222 within message stream 221a and one of chat bubbles 222 within message stream 221b is labeled for clarity purposes even though each message exchanged between user 201 and user 202 is included within one of chat bubbles 222.

FIG. 2 illustrates an example of a game that can be created and played within a message stream that allows users to generate play levels using the actual chat conversation within the message stream. Users are provided with a game trigger that the users can activate in order to place objects within the chat conversation. The objects are then able to interact with the chat messages (chat bubbles) of the chat conversation between the users during the playing of the game. As such, users are able to design game levels through posting typical chat conversations, which include both the chat messages and the objects. This gives the users the ability to create different game levels each time the users decide to play a game, since the size and types of chat messages and objects will differ within a chat conversation each time a game is played within the message stream.

In the implementation of FIG. 2, mobile device 210 includes message stream 221a, which may correspond to a chat conversation between user 201 and user 202 during the creation of a game. For example, user 201 may have used game selection 227 to select a shooting game to play with user 202, where the shooting game is created within message stream 221a using chat bubbles 222. To begin the game, user 201 first sends game request 270 to user 202 by posting game request 270 within one of chat bubbles 222 of message stream 221a. In the implementation of FIG. 2, game request 270 says "Let us play a game". Next, user 201 sends user 202 the name of the game and the instructions within two more of chat bubbles 222, where the instructions tell user 202 to "Try and hit the apple," which is illustrated as game object 224. After sending game request 270 to user 202, user 201 then receives game acceptance 271 within another one of chat bubbles 222 of message stream 221a.

Continuing with the implementation of FIG. 2, mobile device 250 includes message stream 221b, which may correspond to message stream 221a except that user 202 has now started playing the shooting game. As illustrated in message stream 221b, user 202 first has to shoot chat bubbles 222 which were illustrated in message stream 221a in order for game object 224 to be visible. After shooting each of chat bubbles 222, user 202 then has to shoot game object 224 within message stream 221b to win the game.

Figure 3:
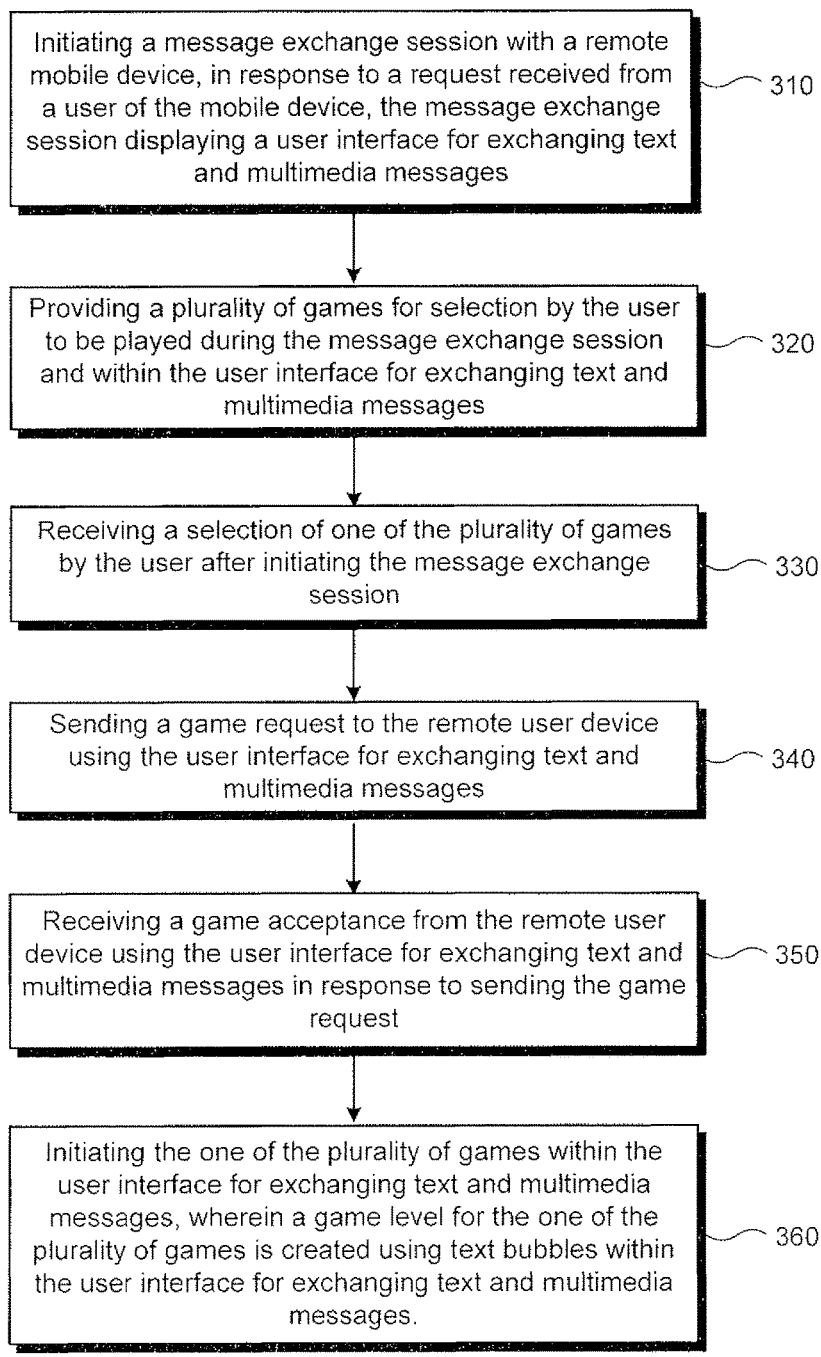
FIG. 3 shows a flowchart illustrating a method for generating user generated gameplay levels in a chat thread, according to one implementation of the present disclosure.

FIG. 3 shows a flowchart illustrating a method for generating user generated gameplay levels in a chat thread, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIGS. 1 and 2, the disclosed inventive concepts are not intended to be limited by specific features shown and described with respect to FIGS. 1 and 2. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 includes (at 310) initiating a message exchange session with a remote mobile device, in response to a request received from a user of the mobile device, the message exchange session displaying a user interface for exchanging text and multimedia messages. For example, processor 111 of mobile device 110/210 may execute messaging software application 120 to open a message exchange session with mobile device 150/250, in response to a request received from user 101/201 of mobile device 110/210, the message exchange session displaying message stream 121/221a. As discussed above, message stream 121/221a may be used to exchange text and multimedia messages with mobile device 150/250.

Flowchart 300 further includes (at 320) providing a plurality of games for selection by the user to be played during the message exchange session and within the user interface for exchanging text and multimedia messages. For example, processor 111 of mobile device 110/210 may execute messaging software application 120 to provide games 131 for selection by user 101/201 to be played during the message exchange session within message stream 121/221a. As discussed above, user 101/201 may be provided with games 131 using game selection 127/227.

Flowchart 300 further includes (at 330) receiving a selection of one of the plurality of games by the user after initiating the message exchange session. For example, processor 111 of mobile device 110/210 may execute messaging software application 120 to receive a selection of one of games 131 by user 101/201 after initiating the messaging exchange session. As discussed above, user 101/201 may select one of games 131 using game selection 127/227.

Flowchart 300 further includes (at 340) sending a game request to the remote user device using the user interface for exchanging text and multimedia messages. For example, processor 111 of mobile device 110/210 may execute messaging software application 120 to send game request 170/270 to mobile device 150/250 using message stream 121/221a. As discussed above, game request 170/270 may be sent to mobile device 150/250 by posting game request 170/270 within one of chat bubbles 122/222.

Flowchart 300 further includes (at 350) receiving a game acceptance from the remote user device using the user interface for exchanging text and multimedia messages in response to sending the game request. For example, processor 111 of mobile device 110/210 may execute messaging software application 120 to receive game acceptance 171/271 from mobile device 150/250 using message stream 121/221a in response to sending game request 170/270.

Flowchart 300 also includes (at 360) initiating one of the plurality of games within the user interface for exchanging text and multimedia messages, wherein a game level for the one of the plurality of games is created using chat bubbles within the user interface for exchanging text and multimedia messages. For example, processor 111 of mobile device 110/210 may execute messaging software application 120 to initiate the one of games 131 within message stream 121/221a, wherein a game level for the one of games 131 is created using chat bubbles 122/222 within message stream 121/221a. As discussed above, the game level for the one of games 131 may further be created using game objects 124/224 selected from objects 132.

Figure 4A:
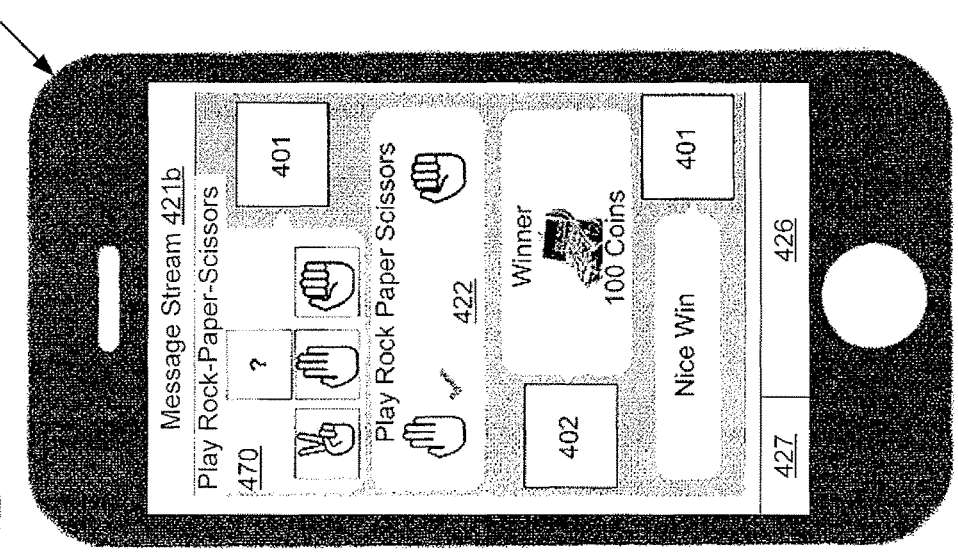
FIG. 4A presents a first example of integrating game mechanics in a chat thread, according to one implementation of the present disclosure.
Figure 4B:
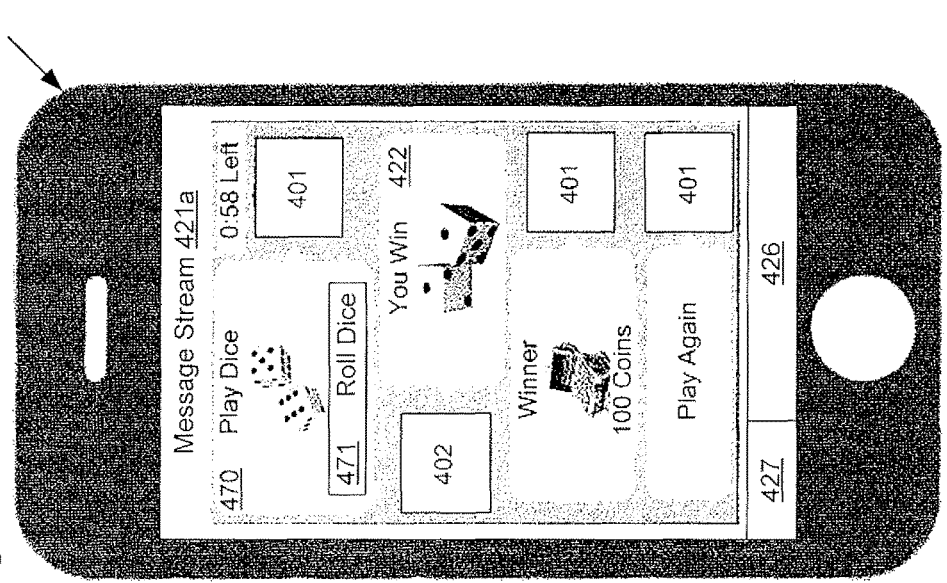
FIG. 4B presents a second example of integrating game mechanics in a chat thread, according to one implementation of the present disclosure.

As a preliminary note to FIGS. 4A and 4B, FIGS. 4A and 4B illustrate examples of games that can use the message stream to integrate game mechanics into the chat conversation. The game mechanics work by providing a game selection button within the messaging application. Using the game selection button, a first user is able to select a game to be played. Once a game is selected, a game request is posted within the message stream (in a chat bubble), where the game request includes a game acceptance button. When a second user taps on the game acceptance button within the message stream, the game will trigger a response. These games may include, but are not limited to, dice rolling games, trivia games, rock-paper-scissors games, time based games, and scratchers games. As such, these games may be played between just two users using two different mobile devices, or these games may be played between multiple users on multiple mobile devices.

FIG. 4A presents a first example of integrating game mechanics in a chat thread, according to one implementation of the present disclosure. FIG. 4A includes mobile device 410, which includes message stream 421a, keyboard 426, and game selection 427. Message stream 421a includes chat bubbles 422 (corresponding to messages exchanged between user 401 and user 402 within message stream 421a), game request 470, and game acceptance 471.

With respect to FIG. 4A, it should be noted that user 401, user 402, mobile device 410, message stream 421a, chat bubbles 422, keyboard 426, game selection 427, game request 470, and game acceptance 471 correspond respectively to user 101, user 102, mobile device 110, message stream 121, chat bubbles 122, keyboard 126, game selection 127, game request 170, and game acceptance 171 from FIG. 1. It should further be noted that only one of chat bubbles 422 within message stream 421a is labeled for clarity purposes even though each message exchanged between user 401 and user 402 is included within one of chat bubbles 422.

In the implementation of FIG. 4A, user 401 may have used game selection 427 to look through the possible games that are available to be played within message stream 421a and clicked on a game icon that corresponds to a dice rolling game. In response to selecting the dice rolling game, game request 470 has been posted using one of chat bubbles 422 within message stream 421a along with game acceptance 471, which corresponds to a button that can be used by user 402 to accept game request 470. User 402 may have then seen game request 471 within message stream 421a being displayed on his or her own mobile device (not shown), and selected game acceptance 471. In response to user 402 selecting game acceptance 471, the dice rolling game rolled the dice and selected a winner based on the roll. The dice rolling game further awarded the winner a prize (illustrated as 100 coins). Finally, user 401 posted another message within message stream 421a to play again, which user 402 can select to play the dice rolling game a second time.

It should be noted that the implementation of FIG. 4A illustrates a timer within message stream 421a. In such implementations that include a timer, user 402 may only have a set amount of time to accept game request 470 before game request 470 is cancelled and thus no game is created or played. For example, and as illustrated in FIG. 4A, user 402 had fifty-eight seconds left to accept game request 470 when user 402 selected game acceptance 471.

FIG. 4B presents a second example of integrating game mechanics in a chat thread, according to one implementation of the present disclosure. FIG. 4B includes mobile device 410, which includes message stream 421b, keyboard 426, and game selection 427. Message stream 421b includes chat bubbles 422 (corresponding to messages exchanged between user 401 and user 402 within message stream 421b), game request 470, and game acceptance 471.

With respect to FIG. 4B, it should be noted that user 401, user 402, mobile device 410, message stream 421b, chat bubbles 422, keyboard 426, game selection 427, game request 470, and game acceptance 471 correspond respectively to user 101, user 102, mobile device 110, message stream 121, chat bubbles 122, keyboard 126, game selection 127, game request 170, and game acceptance 171 from FIG.

1. It should further be noted that only one of chat bubbles 422 within message stream 421b is labeled for clarity purposes even though each message exchanged between user 401 and user 402 is included within one of chat bubbles 422.

In the implementation of FIG. 4B, user 401 may now have used game selection 427 and clicked on a game icon that corresponds to a rock-paper-scissors game. In response to selecting the rock-paper-scissors game, game request 470 has been posted within message stream 421b along with icons for a rock, a paper, and scissors. User 401 then uses message stream 421b being displayed on mobile device 410, and user 402 uses message stream 421b being displayed on his or her own mobile device (not shown), to select either the rock icon, the paper icon, or the scissors icon within game request 470. After each of user 401 and user 402 make a selection, the rock-paper-scissors game decides who wins and awards the winner with a prize (illustrated as 100 coins).

Figure 5:
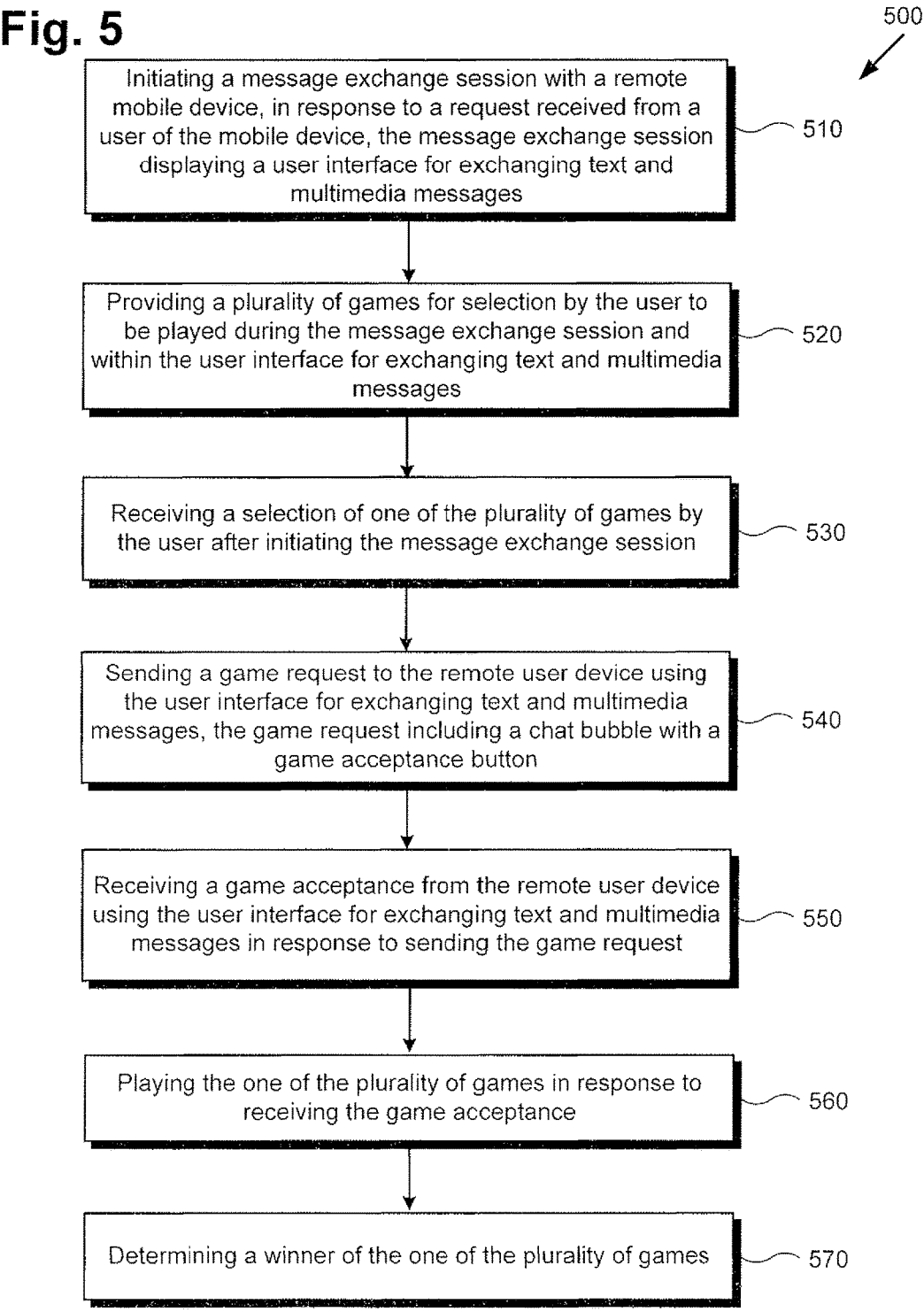
FIG. 5 shows a flowchart illustrating a method for integrating game mechanics in a chat thread, according to one implementation of the present disclosure.

FIG. 5 shows a flowchart illustrating a method for integrating game mechanics in a chat thread, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIGS. 1, 4A, and 4B, the disclosed inventive concepts are not intended to be limited by specific features shown and described with respect to FIGS. 1, 4A, and 4B. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 includes (at 510) initiating a message exchange session with a remote mobile device, in response to a request received from a user of the mobile device, the message exchange session displaying a user interface for exchanging text and multimedia messages. For example, processor 111 of mobile device 110/410 may execute messaging software application 120 to open a message exchange session with mobile device 150, in response to a request received from user 101/401 of mobile device 110/410, the message exchange session displaying message stream 121/421a/421b. As discussed above, message stream 121/421a/421b may be used to exchange text and multimedia messages with mobile device 150.

Flowchart 500 further includes (at 520) providing a plurality of games for selection by the user to be played during the message exchange session and within the user interface for exchanging text and multimedia messages. For example, processor 111 of mobile device 110/410 may execute messaging software application 120 to provide games 131 for selection by user 101/401 to be played during the message exchange session within message stream 121/421a/421b. As discussed above, user 101/401 may be provided with games 131 using game selection 127/427. Games 131 may include, but are not limited to, dice rolling games, trivia games, rock-paper-scissors games, time based games, and scratchers games.

Flowchart 500 further includes (at 530) receiving a selection of one of the plurality of games by the user after initiating the message exchange session. For example, processor 111 of mobile device 110/410 may execute messaging software application 120 to receive a selection of one of games 131 by user 101/401 after initiating the messaging exchange session. As discussed above, user 101/401 may select one of games 131 using game selection 127/427.

Flowchart 500 further includes (at 540) sending a game request to the remote user device using the user interface for exchanging text and multimedia messages, the game request including a chat bubble with a game acceptance button. For example, processor 111 of mobile device 110/410 may execute messaging software application 120 to send game request 170/470 to mobile device 150 using message stream 121/421a/421b, game request 170/470 including one of chat bubbles 122/422 with game acceptance 171/471 button.

Flowchart 500 further includes (at 550) receiving a game acceptance from the remote user device using the user interface for exchanging text and multimedia messages in response to sending the game request. For example, processor 111 of mobile device 110/410 may execute messaging software application 120 to receive game acceptance 171/471 from mobile device 150 using message stream 121/421a/421b in response to sending game request 170/470. As discussed above, mobile device 110/410 may receive game acceptance 171/471 when user 102/402 selects game acceptance 171/471 button within message stream 121/421a/421b on mobile device 150.

Flowchart 500 further includes (at 560) playing the one of the plurality of games in response to receiving the game acceptance and (at 570) determining a winner of the one of the plurality of games. For example, processor 111 of mobile device 110/410 may execute messaging software application 120 to play the one of games 131 in response to receiving game acceptance 171/471 and determine a winner for the one of games 131. As discussed above, the one of games 131 may be played within message stream 121/421a/421b.

Figure 6:
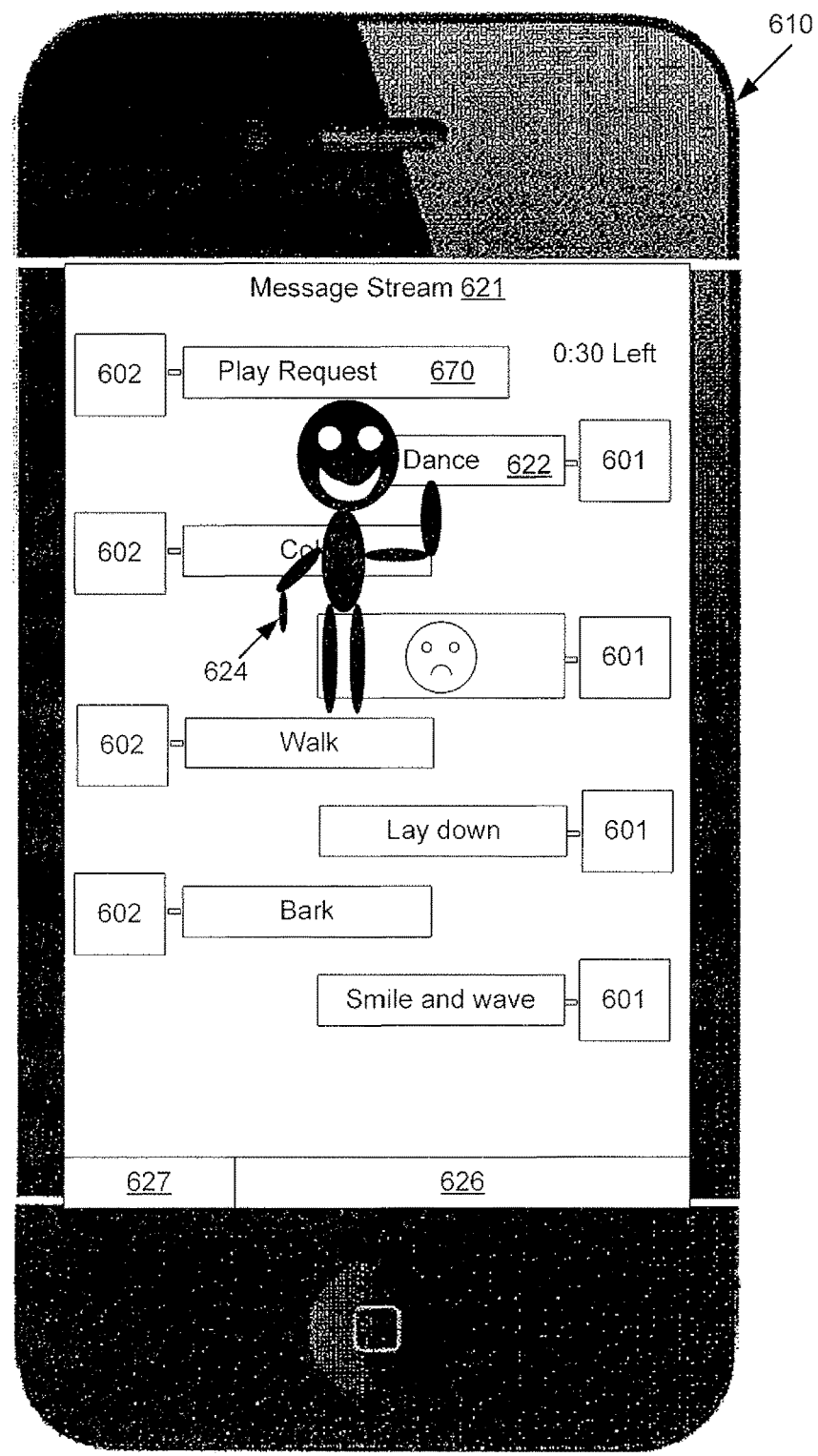
FIG. 6 presents an example of chat message gameplay scripting, according to one implementation of the present disclosure.

FIG. 6 presents an example of chat message gameplay scripting, according to one implementation of the present disclosure. FIG. 6 includes mobile device 610, which includes message stream 621, keyboard 626, and game selection 627. Message stream 621 includes chat bubbles 622 (corresponding to messages exchanged between user 601 and user 602 within message stream 621), game object 624, and game request 670.

With respect to FIG. 6, it should be noted that user 601, user 602, mobile device 610, message stream 621, chat bubbles 622, game object 624, keyboard 626, game selection 627, and game request 670 correspond respectively to user 101, user 102, mobile device 110, message stream 121, chat bubbles 122, one of game objects 124, keyboard 126, game selection 127, and game request 170 from FIG. 1. It should further be noted that only one of chat bubbles 622 within message stream 621 is labeled for clarity purposes even though each message exchanged between user 601 and user 602 is included within one of chat bubbles 622.

FIG. 6 illustrates an example of a game that can be created within a message stream that includes chat message gameplay scripting. To play the game, users are provided with a game trigger that activates a game object within the message stream. The users are then able to control the game object using chat messages posted within the message stream. The game trigger can either be a game selection button that is provided within the messaging application, or the game trigger can be a certain word or combination of words that is posted within one of the chat messages. After activating the game object within the message stream, the game object may remain in the message stream for a given amount of time or until one of the users ends the game.

In the implementation of FIG. 6, user 602 posts game request 670 within message stream 621, which is displayed on mobile device 610 in possession of user 601. Game request 670 includes the words "Play Request" posted within one of chat bubbles 622. In response to user 602 posting game request 670 within message stream 621, game object 624 is activated and appears within message stream 621. Game object 624 is illustrated as an avatar in the implementation of FIG. 6, however, in other implementations, game object 624 may take the form of other objects, such as one of objects 132 from FIG. 1.

Continuing with the implementation of FIG. 6, user 601 and user 602 are able to control game object 624 using chat messages posted within message stream 621 after game object 624 has been activated, where chat messages are represented by chat bubbles 622. For example, user 601 posting "Dance" within message stream 621 may cause game object 624 to dance. For a second example, user 601 posting a sad face icon within message stream 621 may cause game object 624 to be sad. Finally, for a third example, user 602 posting "Smile and wave" within message stream 621 may cause game object 624 to both smile and wave, which is illustrated in FIG. 6.

Figure 7:
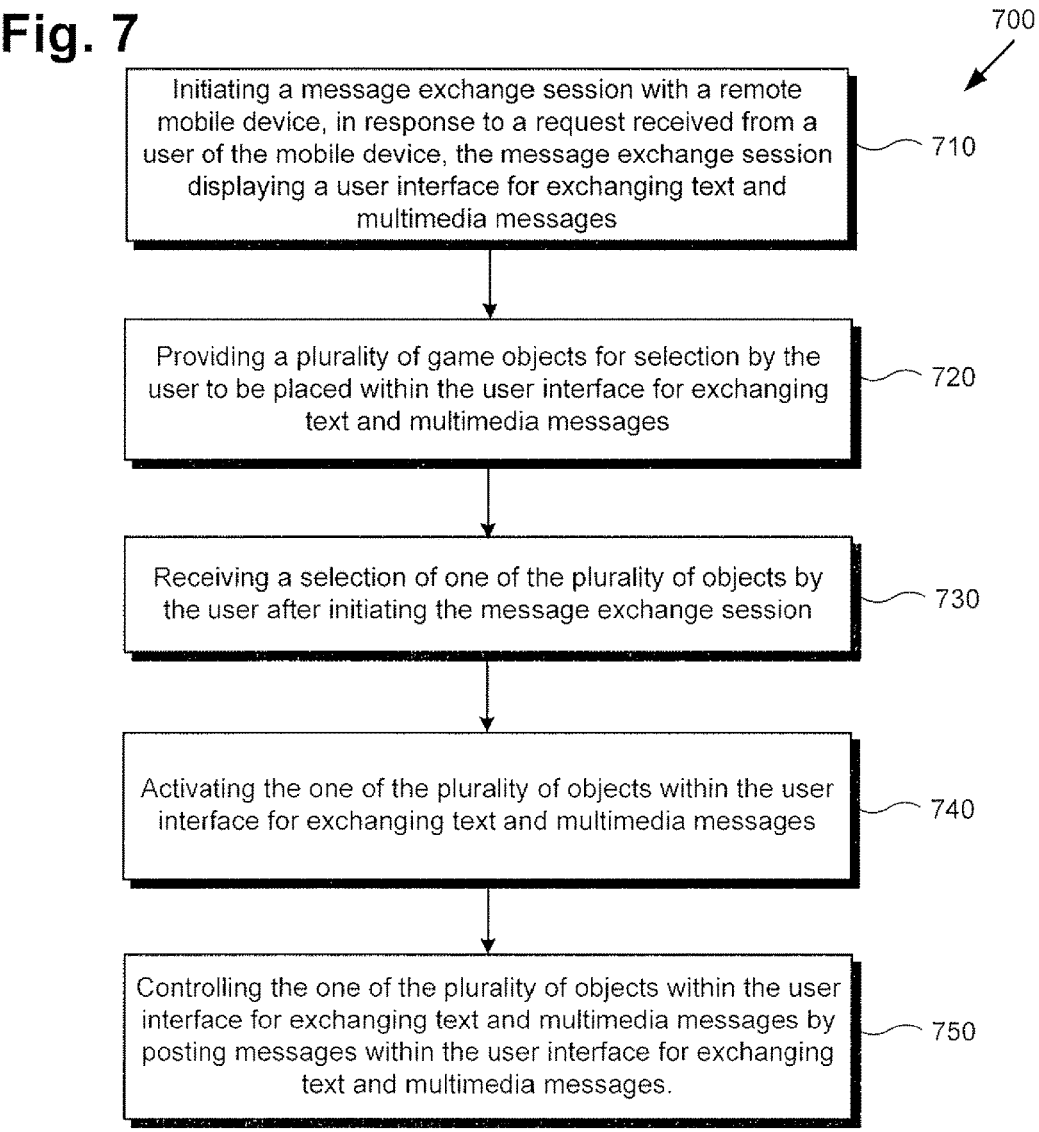
FIG. 7 shows a flowchart illustrating a method for chat message gameplay scripting, according to one implementation of the present disclosure.

FIG. 7 shows a flowchart illustrating a method for chat message gameplay scripting, according to one implementation of the present disclosure. The approach and technique indicated by flowchart 700 are sufficient to describe at least one implementation of the present disclosure, however, other implementations of the disclosure may utilize approaches and techniques different from those shown in flowchart 700. Furthermore, while flowchart 700 is described with respect to FIGS. 1 and 6, the disclosed inventive concepts are not intended to be limited by specific features shown and described with respect to FIGS. 1 and 6. Furthermore, with respect to the method illustrated in FIG. 7, it is noted that certain details and features have been left out of flowchart 700 in order not to obscure the discussion of inventive features in the present application.

Referring now to flowchart 700 of FIG. 7, flowchart 700 includes (at 710) initiating a message exchange session with a remote mobile device, in response to a request received from a user of the mobile device, the message exchange session displaying a user interface for exchanging text and multimedia messages. For example, processor 111 of mobile device 110/610 may execute messaging software application 120 to open a message exchange session with mobile device 150, in response to a request received from user 101/601 of mobile device 110/610, the message exchange session displaying message stream 121/621. As discussed above, message stream 121/621 may be used to exchange text and multimedia messages with mobile device 150.

Flowchart 700 further includes (at 720) providing a plurality of objects for selection by the user to be placed within the user interface for exchanging text and multimedia messages. For example, processor ill of mobile device 110/610 may execute messaging software application 120 to provide objects 132 and/or avatars 133 for selection by user 101/601 to be placed within message stream 121/621. As discussed above, objects 132 may include, but are not limited to, people, cars, buildings, food, animals, pictures, or movie clips.

Flowchart 700 further includes (at 730) receiving a selection of one of the plurality of objects by the user after initiating the message exchange session. For example, processor 111 of mobile device 110/610 may execute messaging software application 120 to receive a selection of one of objects 132 and/or avatars 133 by user 101/601 after initiating the messaging exchange session, where the one of objects 132 and/or avatars 133 selected by user 101/601 may include game object 124/624.

Flowchart 700 further includes (at 740) activating the one of the plurality of objects within the user interface for exchanging text and multimedia messages. For example, processor 111 of mobile device 110/610 may execute messaging software application 120 to activate game object 124/624 within message stream 121/621. As illustrated in FIG. 6, game object 124/624 includes an avatar.

Flowchart 700 further includes (at 750) controlling the one of the plurality of objects within the user interface for exchanging text and multimedia messages by posting messages within the user interface for exchanging text and multimedia messages. For example, processor 111 of mobile device 110/610 may execute messaging software application 120 to control game object 124/624 within message stream 121/621 by posting messages within message stream 121/621. For example, user 101/601 posting "Dance" within message stream 121/621 may cause game object 124/624 to dance. For a second example, user 101/601 posting a sad face icon within message stream 121/621 may cause game object 124/624 to be sad. Finally, for a third example, user 102/602 posting "Smile and wave" within message stream 121/621 may cause game object 124/624 to both smile and wave, which is illustrated in FIG. 6.

Figure 8:
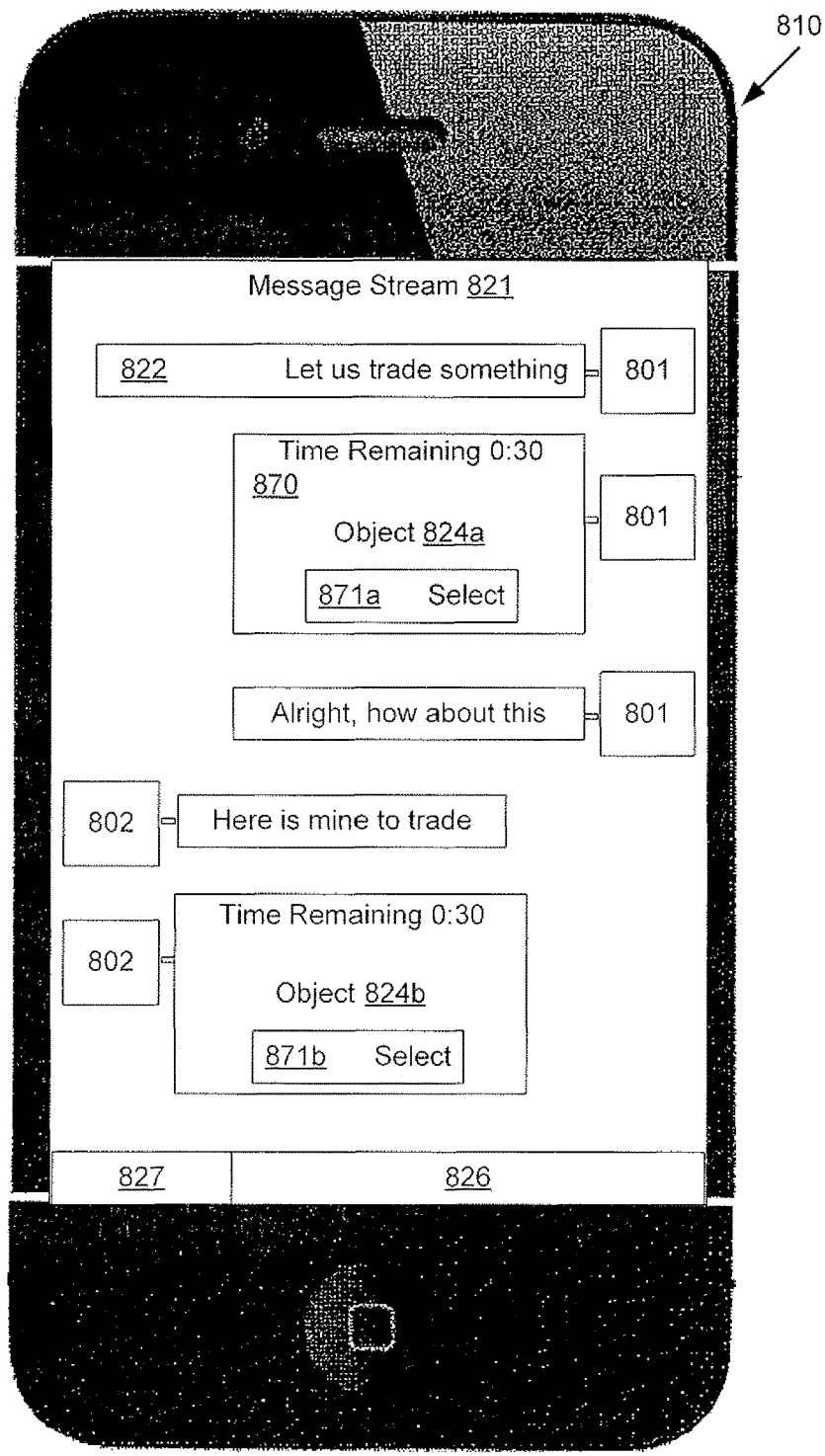
FIG. 8 presents an example of chat based trading with limited time mechanics, according to one implementation of the present disclosure.

FIG. 8 presents an example of chat based trading with limited time mechanics, according to one implementation of the present disclosure. FIG. 8 includes mobile device 810, which includes message stream 821, keyboard 826, and game selection 827. Message stream 821 includes chat bubbles 822 (corresponding to messages exchanged between user 801 and user 802 within message stream 821), game object 824a, game object 824b, game acceptance 871a and game acceptance 871b.

With respect to FIG. 8, it should be noted that user 801, user 802, mobile device 810, message stream 821, chat bubbles 822, each of game object 824a and game object 824b, and each of game acceptance 871a and game acceptance 871b correspond respectively to user 101, user 102, mobile device 110, message stream 121, chat bubbles 122, game objects 124, and game acceptance 171 from FIG. 1. It should further be noted that only one of chat bubbles 822 within message stream 821 is labeled for clarity purposes even though each message exchanged between user 801 and user 802 is included within one of chat bubbles 822.

FIG. 8 illustrates an example of a game that can be created within a message stream that includes trading objects (or items) between users within the message stream. For example, a first user that wants to trade a first object would post the first object in the message stream, where the post would include a first acceptance button. A second user would then post a second object that he or she wanted to trade in the message stream, where that post would include a second acceptance button. The first user would then have to accept the second object using the second acceptance button in the message stream and the second user would have to accept the first object using the first acceptance button in the message stream for the trade to occur. If both users do not accept the trade within a given time limit, or if one of the users declines the trade by ending the game, then the trade will not occur.

In the implementation of FIG. 8, user 801 first posts game request 470 within message stream 821, which is being displayed on mobile device 810 in possession of user 801. Game request 870 may be posted in response to user 801 using game selection 827 to select a trading game, or game request 870 may be posted in response to user 801 just posting in message stream 821 "Let us trade something". User 801 then posts game object 824a within message stream 821 for trading with user 802, where game object 824*a* is posted within one of chat bubbles 822 along with game acceptance 871*a* button. Furthermore, user 801 posts a chat message in message stream 821 asking user 802 if he or she wants to trade, where the chat message says "Alright, how about this".

In response to the user 801 posting game object 824*a* to trade, user 802 first notifies user 801 that user 802 is willing to try and make a trade by posting "Here is mine to trade" within message stream 821. User 802 then posts game object 824*b* within message stream 821 for trading with user 801, where game object 824*b* is posted within one of chat bubbles 822 along with game acceptance 871*b* button. In order for a trade to be made, user 801 must select game acceptance 871*b* button and user 802 must select game acceptance 871*a* button within message stream 821 before running out of time. As illustrated in FIG. 8, there is thirty second remaining for the trade to be made.

It should be noted that the implementation of FIG. 8 is just one example of trading objects within a trading game, however, the present disclosure is not limited to the implementation of FIG. 8. For example, in other implementations, user 801 may start the trading game by just posting game object 824*a* within message stream 821. In such implementations, the posting of game object 824*a* within message stream 821 would act as game request 870. Furthermore, in other implementations, only one of user 801 and user 802 have to accept the trade to the trade to occur.

Figure 9:
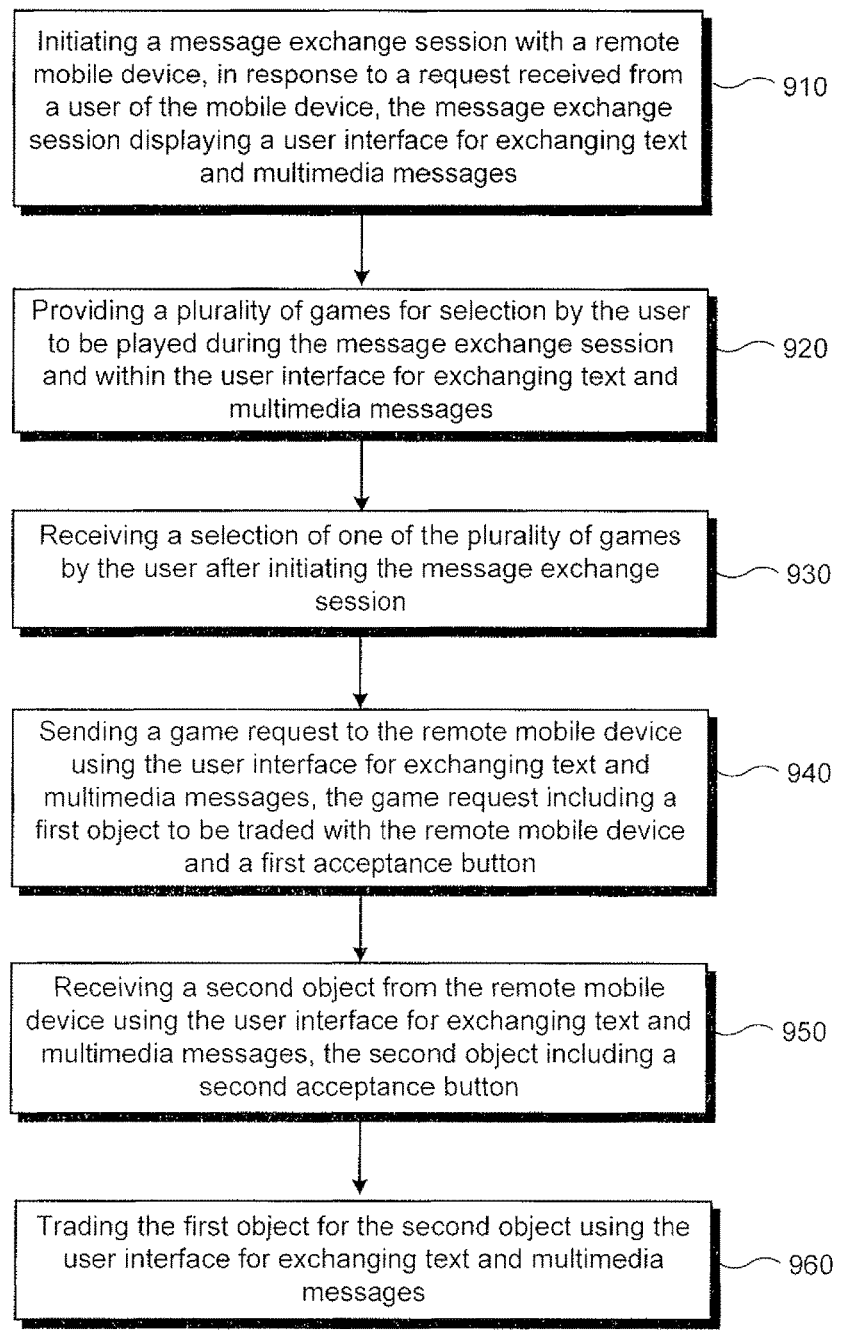
FIG. 9 shows a flowchart illustrating a method for chat based trading with limited time mechanics, according to one implementation of the present disclosure.

FIG. 9 shows a flowchart illustrating a method for chat based trading with limited time mechanics, according to one implementation of the present disclosure. The approach and technique indicated by flowchart 900 are sufficient to describe at least one implementation of the present disclosure, however, other implementations of the disclosure may utilize approaches and techniques different from those shown in flowchart 900. Furthermore, while flowchart 900 is described with respect to FIGS. 1 and 8, the disclosed inventive concepts are not intended to be limited by specific features shown and described with respect to FIGS. 1 and 8. Furthermore, with respect to the method illustrated in FIG. 9, it is noted that certain details and features have been left out of flowchart 900 in order not to obscure the discussion of inventive features in the present application.

Referring now to flowchart 900 of FIG. 9, flowchart 900 includes (at 910) initiating a message exchange session with a remote mobile device, in response to a request received from a user of the mobile device, the message exchange session displaying a user interface for exchanging text and multimedia messages. For example, processor 111 of mobile device 110/810 may execute messaging software application 120 to open a message exchange session with mobile device 150, in response to a request received from user 101/801 of mobile device 110/810, the message exchange session displaying message stream 121/821. As discussed above, message stream 121/821 may be used to exchange text and multimedia messages with mobile device 150.

Flowchart 900 further includes (at 920) providing a plurality of games for selection by the user to be played during the message exchange session and within the user interface for exchanging text and multimedia messages. For example, processor 111 of mobile device 110/810 may execute messaging software application 120 to provide games 131 for selection by user 101/801 to be played during the message exchange session within message stream 121/821. As discussed above, user 101/801 may be provided with games 131 using game selection 127/827. Games 131 may include, but are not limited to, a trading game.

Flowchart 900 further includes (at 930) receiving a selection of one of the plurality of games by the user after initiating the message exchange session. For example, processor 111 of mobile device 110/810 may execute messaging software application 120 to receive a selection of one of games 131 by user 101/801 after initiating the messaging exchange session. As discussed above, user 101/801 may select one of games 131 using game selection 127/827.

Flowchart 900 further includes (at 940) sending a game request to the remote mobile device using the user interface for exchanging text and multimedia messages, the game request including a first object to be traded with the remote mobile device and a first acceptance button. For example, processor 111 of mobile device 110/810 may execute messaging software application 120 to send game request 170/870 to mobile device 150 using message stream 121/821, game request 170/870 including first game object 124/824*a* to be traded with mobile device 150 and game acceptance 171/871*a* button. As discussed above, game request 170/870 may be sent in one of chat bubbles 122/822.

Flowchart 900 further includes (at 950) receiving a second object from the remote mobile device using the user interface for exchanging text and multimedia messages, the second object including a second acceptance button. For example, processor 111 of mobile device 110/810 may execute messaging software application 120 to receive second game object 124/824*b* from mobile device 150 using message stream 121/821, second game object 124/824*b* including game acceptance 171/871*b* button. As discussed above, second game object 124/824*b* may be received within one of chat bubbles 122/822.

Flowchart 900 further includes (at 960) trading the first object for the second object using the user interface for exchanging text and multimedia messages. For example, processor 111 of mobile device 110/810 may execute messaging software application 120 to trade first game object 124/824*a* for second game object 124/824*b* using message stream 121/821. As discussed above, first game object 124/824*a* will be traded for second game object 124/824*b* when user 101/801 clicks on game acceptance 171/871*b* button and user 102/802 clicks on game acceptance 171/871*a* button.

Figure 10:
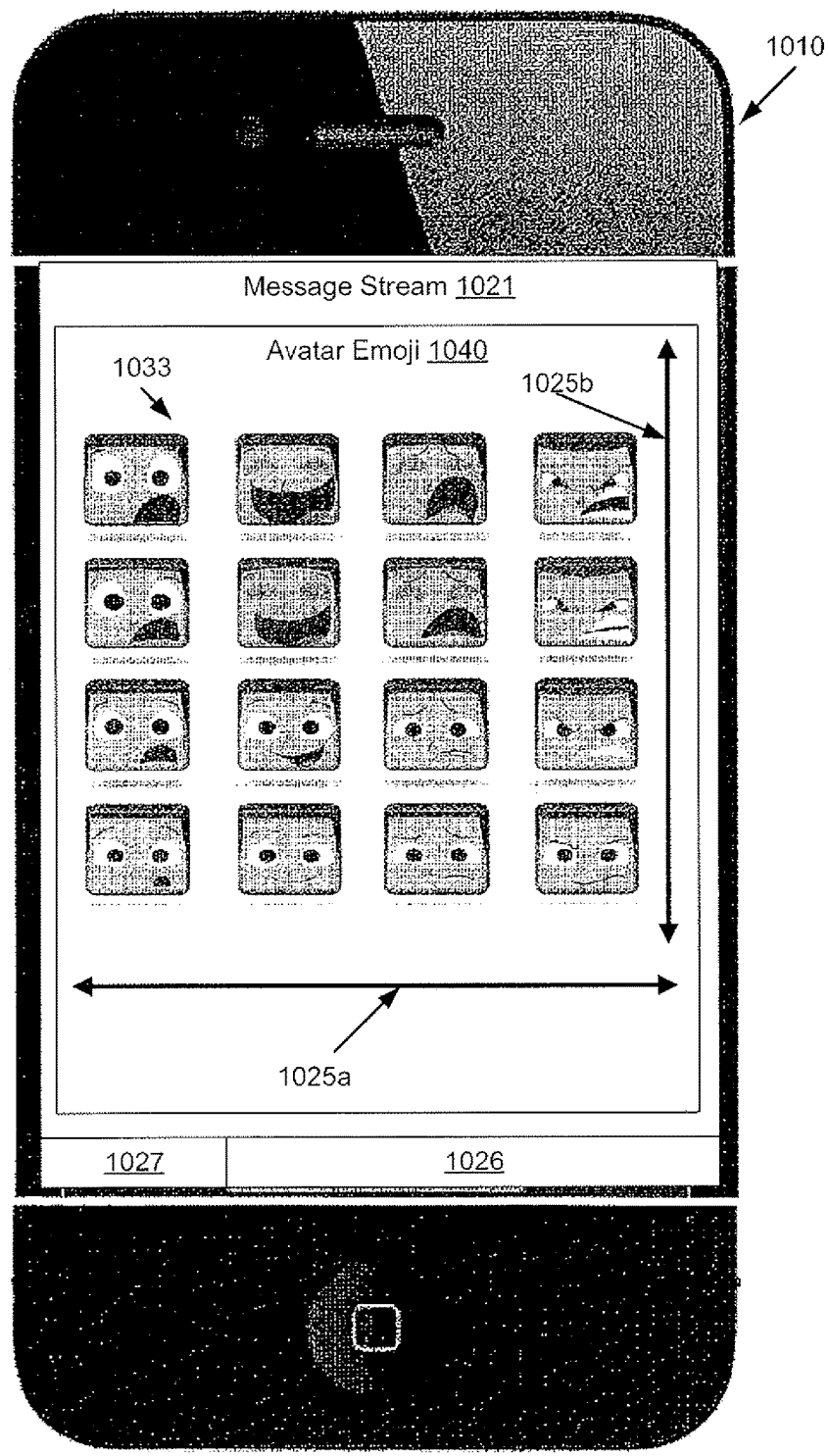
FIG. 10 presents an example of a multi modal integrated Avatar emoji, according to one implementation of the present disclosure.

FIG. 10 presents an example of a multi modal integrated Avatar emoji, according to one implementation of the present disclosure. FIG. 10 includes mobile device 1010, which includes message stream 1021, keyboard 1026, and game selection 1027. Message stream 1021 includes avatar emoji 1040, which includes avatars 1033. Message stream 1021 further includes user input 1025*a* and user input 1025*b*, which are collectively referred to as user input 1025. With respect to FIG. 10, it should be noted that mobile device 1010, message stream 1021, user input 1025, keyboard 1026, game selection 1027, and avatars 1033 correspond respectively to mobile device 1010, message stream 121, user input 125, keyboard 126, game selection 127, and avatars 133 from FIG. 1.

In the implementation of FIG. 10, a first user (such as user 101 from FIG. 1) may be using mobile device 1010 to exchange text and multimedia messages with a second user on another mobile device (such as user 102 on mobile device 150 from FIG. 1) within message stream 1021. The first user may want to express how he or she feels within message stream 1021. In order to express his or her feelings, the first user may open a multi modal integrated avatar emoji, such as avatar emoji 1040 of FIG. 10. For example, and discussed above, keyboard 1026 may include a special keyboard that can be used to type special figures, such as different emotional faces or objects. As such, the first user may have opened avatar emoji 1040 using keyboard 1026.

As illustrated in FIG. 10, avatar emoji 1040 includes avatars 1033, with each of avatars 1033 including a different emotional expression. For example, the avatars in the first column include scared expressions, the avatars in the second column include happy expressions, the avatars in the third column include sad expressions, and the avatars in the fourth column include angry expressions. Furthermore, the intensity level for avatars 1033 changes within each of the rows. For example, the expressions of the avatars in the first row include the highest level of intensity for each expression, and the avatars in the fourth row include the lower level of intensity for each expression.

Avatar emoji 1040 makes it easy for the user of mobile device 1010 to quickly select the one of avatars 1033 that best fits his or her emotional mood. In order to select one of avatars 1033 within avatar emoji 1040, the user swipes horizontally using user input 1025*a* (represented by the line that includes left and right arrows) to select which emotion the user is feeling. The user may then swipe vertically using user input 1025*b* (represented by the line that includes up and down arrows) to select the level of intensity for the selected emotion. After an avatar has been selected, mobile device 1010 may post the selected avatar message stream 1021 to represent the current emotion of the user.

It should be noted that the implementation of FIG. 10 only illustrates avatar emoji 1040 as including avatars 1033 representing different emotions, however, the present disclosure is not limited to the implementation of FIG. 10. In other implementations, avatars may represent something other than emotions. For example, the avatars may each represent a different sports team or sporting event. In such an example, each avatar may be wearing sporting gear from a specific sports team or sporting event. Still in other implementations, avatar emoji 1040 may include objects other than avatars, such as objects 132 from FIG. 1. In such, implementations, the user may select between different objects 132 using a similar method as discussed above.

Figure 11:
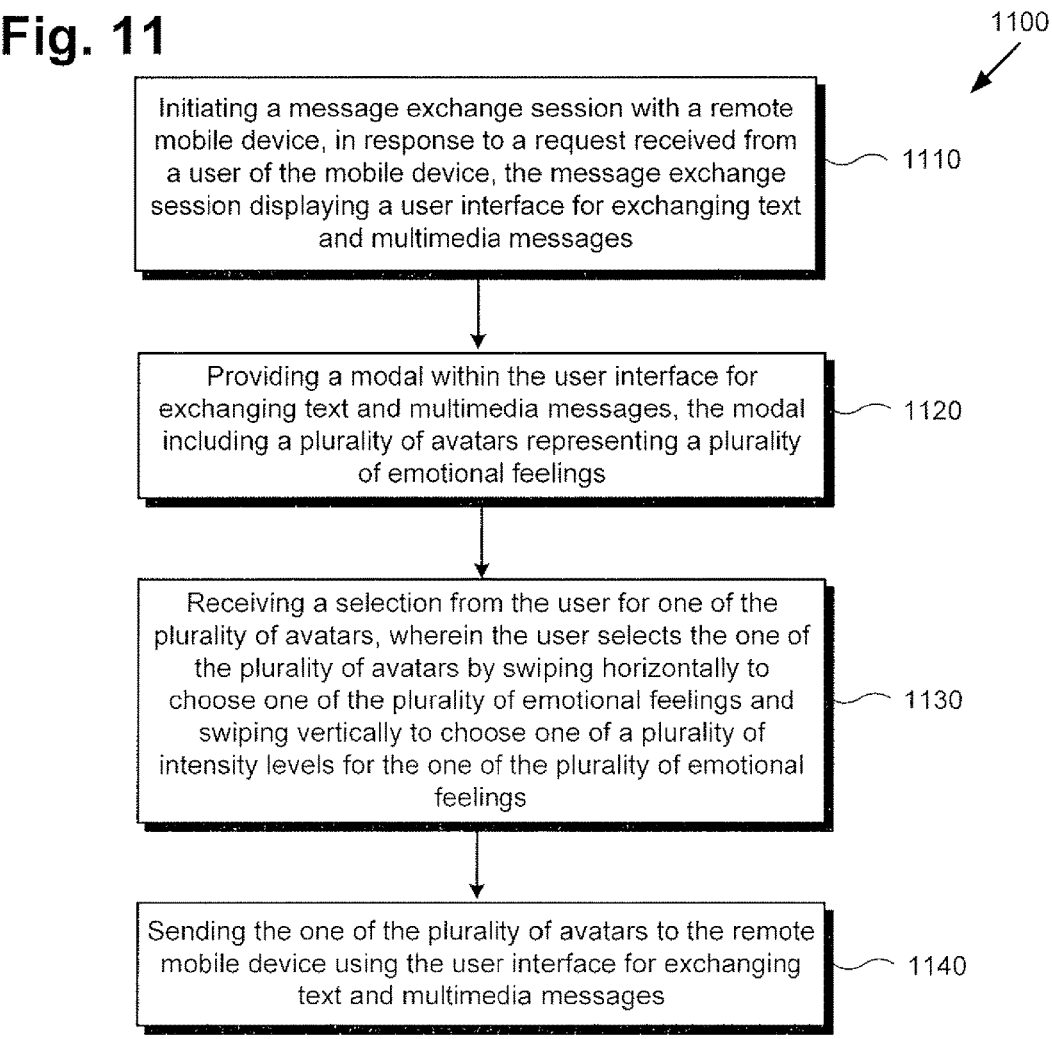
FIG. 11 shows a flowchart illustrating a method for using a multi modal integrated Avatar emoji, according to one implementation of the present disclosure.

FIG. 11 shows a flowchart illustrating a method for using a multi modal integrated Avatar emoji, according to one implementation of the present disclosure. The approach and technique indicated by flowchart 1100 are sufficient to describe at least one implementation of the present disclosure, however, other implementations of the disclosure may utilize approaches and techniques different from those shown in flowchart 1100. Furthermore, while flowchart 1100 is described with respect to FIGS. 1 and 10, the disclosed inventive concepts are not intended to be limited by specific features shown and described with respect to FIGS. 1 and 10. Furthermore, with respect to the method illustrated in FIG. 11, it is noted that certain details and features have been left out of flowchart 1100 in order not to obscure the discussion of inventive features in the present application.

Referring now to flowchart 1100 of FIG. 11, flowchart 1100 includes (at 1110) initiating a message exchange session with a remote mobile device, in response to a request received from a user of the mobile device, the message exchange session displaying a user interface for exchanging text and multimedia messages. For example, processor 111 of mobile device 110/1010 may execute messaging software application 120 to open a message exchange session with mobile device 150, in response to a request received from user 101 of mobile device 110/1010, the message exchange session displaying message stream 121/1021. As discussed above, message stream 121/1021 may be used to exchange text and multimedia messages with mobile device 150.

Flowchart 1100 further includes (at 1120) providing a modal within the user interface for exchanging text and multimedia messages, the modal including a plurality of avatars representing a plurality of emotional feelings. For example, processor 111 of mobile device 110/1010 may execute messaging software application 120 to open avatar emoji 1040 within message stream 121/1021, avatar emoji 1040 including avatars 133/1033 representing a plurality of emotional feelings. As discussed above, the avatars in the first column of avatar emoji 1040 include scared expressions, the avatars in the second column of avatar emoji 1040 include happy expressions, the avatars in the third column of avatar emoji 1040 include sad expressions, and the avatars in the fourth column of avatar emoji 1040 include angry expressions.

Flowchart 1100 further includes (at 1130) receiving a selection from the user for one of the plurality of avatars, wherein the user selects the one of the plurality of avatars by swiping horizontally to choose one of the plurality of emotional feelings and swiping vertically to choose one of a plurality of intensity levels for the one of the plurality of emotional feelings. For example, processor 111 of mobile device 110/1010 may execute messaging software application 120 to receive a selection from user 101 for one of avatars 133/1033, wherein user 101 selects the one of avatars 133/1033 by using user input 125/125*a* to choose one of the plurality of emotional feelings and user input 125/125*b* to choose one of a plurality of intensity levels for the one of the plurality of emotional feelings.

Flowchart 1100 further includes (at 1140) sending the one of the plurality of avatars to the remote mobile device using the user interface for exchanging text and multimedia messages. For example, processor 111 of mobile device 110/1010 may execute messaging software application 120 to send the one of avatars 133/1033 to mobile device 150 using message stream 121/1021.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for using a mobile device to generate a game during a message exchange session with a remote mobile device, the method comprising:

initiating the message exchange session with the remote mobile device, in response to a request received from a first user of the mobile device, the message exchange session displaying a user interface for exchanging text and multimedia messages within a plurality of chat bubbles;

providing a plurality of games for selection by the first user to be played by the first user with a second user of the remote mobile device during the message exchange session and within the user interface for exchanging text and multimedia messages;

receiving a selection of one of the plurality of games by the first user after initiating the message exchange session;

initiating the one of the plurality of games for playing within the user interface for exchanging text and multimedia messages, wherein the one of the plurality of games is a shooting game;

receiving, while playing the shooting game, a first shot from the second user shooting a chat bubble of the plurality of chat bubbles to make a game object visible; and displaying the game object of the one of the plurality of games within the user interface, in response to the first shot from the second user shooting the chat bubble to make the game object visible.

2. The method of claim 1 further comprising:

sending a game request to the remote mobile device using the user interface for exchanging text and multimedia messages.

3. The method of claim 2 further comprising:

receiving a game acceptance from the remote mobile device using the user interface for exchanging text and multimedia messages in response to the sending of the game request.

4. The method of claim 1 further comprises:

determining a winner of the one of the plurality of games.

5. The method of claim 1, wherein the initiating the one of the plurality of games is based on at least one of a size and a type of the text bubbles.

6. The method of claim 1 further comprises:

receiving a second shot from the second user shooting the game object made visible after the first shot; and displaying shooting of the game object within the user interface, in response to the second shot from the second user shooting the game object made visible after the first shot.

7. The method of claim 1 further comprising:

prior to initiating the one of the plurality of games, providing a plurality of game objects for selection by the first user to be used during the playing of the one of the plurality of games;

receiving a selection of the game object of the plurality of objects by the first user; and posting the game object of the plurality of objects within the user interface for exchanging text and multimedia messages during the playing of the game.

8. The method of claim 1, wherein the one of the plurality of games is displayed simultaneously with messages exchanged with the remote mobile device during the exchange session and within the user interface for exchanging text and multimedia messages.

9. A mobile device comprising:

a memory storing a text and multimedia messaging software application; and a processor configured to execute the text and multimedia messaging software application to:

initiate a message exchange session with a remote mobile device, in response to a request received from a first user of the mobile device, the message exchange session displaying a user interface for exchanging text and multimedia messages within a plurality of chat bubbles;

provide a plurality of games for selection by the first user to be played by the first user with a second user of the remote mobile device during the message exchange session and within the user interface for exchanging text and multimedia messages;

receive a selection of one of the plurality of games by the first user after initiating the message exchange session;

initiate the one of the plurality of games for playing within the user interface for exchanging text and multimedia messages, wherein the one of the plurality of games is a shooting game;

receive, while playing the shooting game, a first shot from the second user shooting a chat bubble of the plurality of chat bubbles to make a game object visible; and display the game object of the one of the plurality of games within the user interface, in response to the first shot from the second user shooting the chat bubble to make the game object visible.

10. The mobile device of claim 9, wherein before the initiating of the one of the plurality of games, the processor is further configured to execute the text and multimedia messaging software application to:

send a game request to the remote mobile device using the user interface for exchanging text and multimedia messages.

11. The mobile device of claim 10, wherein before the initiating of the one of the plurality of games, the processor is further configured to execute the text and multimedia messaging software application to:

receive a game acceptance from the remote mobile device using the user interface for exchanging text and multimedia messages in response to the sending of the game request.

12. The mobile device of claim 9, wherein the processor is further configured to execute the text and multimedia messaging software application to:

determine a winner of the one of the plurality of games.

13. The mobile device of claim 9, wherein the processor initiates the one of the plurality of games based on at least one of a size and a type of the plurality of chat bubbles.

14. The mobile device of claim 9, wherein the the processor is configured to execute the text and multimedia messaging software application to:

receive a second shot from the second user shooting the game object made visible after the first shot; and display shooting of the game object within the user interface, in response to the second shot from the second user shooting the game object made visible after the first shot.

15. The mobile device of claim 9, wherein the processor is further configured to execute the text and multimedia messaging software application to:

prior to initiating the one of the plurality of games, provide a plurality of game objects for selection by the first user to be used during the playing of the one of the plurality of games;

receive a selection of the game object of the plurality of objects by the first user; and post the game object of the plurality of objects within the user interface for exchanging text and multimedia messages during the playing of the game.

16. The mobile device of claim 9, wherein the one of the plurality of games is displayed simultaneously with messages exchanged with the remote mobile device during the message exchange session and within the user interface for exchanging text and multimedia messages.

* * * * *